US012639218B2

(12) United States Patent
Shechter et al.

(10) Patent No.: US 12,639,218 B2
(45) Date of Patent: **\*May 26, 2026**

(54) SYSTEM AND METHOD FOR SHARING A CACHE LINE BETWEEN NON-CONTIGUOUS MEMORY AREAS

(71) Applicant: Next Silicon Ltd, Givatayim (IL)

(72) Inventors: Dan Shechter, Tel Aviv (IL); Elad Raz, Ramat Gan (IL)

(73) Assignee: Next Silicon Ltd, Givatayim (IL)

( \* ) Notice: Subject to any disclaimer, the term of this patent is extended or adjusted under 35 U.S.C. 154(b) by 0 days.

This patent is subject to a terminal disclaimer.

(21) Appl. No.: 18/928,244

(22) Filed: Oct. 28, 2024

(65) Prior Publication Data

US 2025/0053511 A1 Feb. 13, 2025

Related U.S. Application Data

(63) Continuation of application No. 18/230,689, filed on Aug. 7, 2023, now Pat. No. 12,130,736, which is a continuation of application No. 17/553,931, filed on Dec. 17, 2021, now Pat. No. 11,720,491.

(51) Int. Cl.
*G06F 12/06* (2006.01)
*G06F 12/0895* (2016.01)

(52) U.S. Cl.
CPC ...... *G06F 12/0607* (2013.01); *G06F 12/0895* (2013.01); *G06F 2212/1021* (2013.01)

(58) Field of Classification Search
CPC ............. G06F 12/0607; G06F 12/0895; G06F 2212/1021
See application file for complete search history.

(56) References Cited

U.S. PATENT DOCUMENTS

| | | | |
|---|---|---|---|
| 6,185,654 B1 | 2/2001 | Van Doren | |
| 9,547,599 B2 * | 1/2017 | Tian ..................... | G06F 12/0844 |
| 9,582,420 B2 | 2/2017 | Van Lunteren | |
| 2010/0325374 A1 | 12/2010 | Cypher et al. | |
| 2014/0025908 A1 | 1/2014 | Sharma | |

(Continued)

OTHER PUBLICATIONS

Notice of Allowance Mar. 16, 2023 from the US Patent and Trademark Office Re. U.S. Appl. No. 17/553,931. (7 pages).

(Continued)

*Primary Examiner* — Aracelis Ruiz

(57) ABSTRACT

A method for caching memory comprising caching two data values, each of one of two ranges of application memory addresses, each associated with one of a set of threads, by: organizing a plurality of sequences of consecutive address sub-ranges in an interleaved sequence of address sub-ranges by alternately selecting, for each thread in an identified order of threads, a next sub-range in the respective sequence of sub-ranges associated therewith; generating a mapping of the interleaved sequence of sub-ranges to a range of physical memory addresses in order of the interleaved sequence of sub-ranges; and when a thread accesses an application memory address of the respective range of application addresses associated thereof: computing a target address according to the mapping using the application address; and storing the two data values in one cache-line of a plurality of cache-lines of a cache by accessing the physical memory area using the target address.

21 Claims, 8 Drawing Sheets

(56) References Cited

U.S. PATENT DOCUMENTS

| 2015/0032971 A1 | 1/2015 | Tian et al. |
| 2015/0212940 A1 | 7/2015 | Fowles et al. |
| 2017/0371812 A1 | 12/2017 | Chun |
| 2023/0195619 A1 | 6/2023 | Shechter et al. |
| 2023/0393979 A1 | 12/2023 | Shechter et al. |

OTHER PUBLICATIONS

Notice of Allowance Dated Jul. 1, 2024 from the US Patent and Trademark Office Re. U.S. Appl. No. 18/230,689. (7 pages).
Official Action Dated Nov. 10, 2022 from the US Patent and Trademark Office Re. U.S. Appl. No. 17/553,931. (7 pages).
Official Action Dated Feb. 29, 2024 from the US Patent and Trademark Office Re. U.S. Appl. No. 18/230,689. (15 pages).
Supplementary European Search Report and the European Search Opinion Dated May 23, 2023 From the European Patent Office Re. Application No. 22207649.9. (8 Pages).

* cited by examiner

300

610
Leaf PTE

| 00 | | 612 Phys. Page Num. | | 1 | 1 | |

611
PBI

613
Readable

614
Valid

610A
Leaf PTE

| 01 | | 612A Phys. Page Num. | | 1 | 1 | |

611A
PBI

610B
Leaf PTE

| 10 | | 612B Phys. Page Num. | | 1 | 1 | |

611B
PBI

620
Mid-level
PTE

| | | | 0 | 1 | |

621
PBI

623
Readable

624
Valid

SYSTEM AND METHOD FOR SHARING A CACHE LINE BETWEEN NON-CONTIGUOUS MEMORY AREAS

RELATED APPLICATIONS

This application is a Continuation of U.S. patent application Ser. No. 18/230,689 filed on Aug. 7, 2023, now U.S. Pat. No. 12,130,736, which is a Continuation of U.S. patent application Ser. No. 17/553,931 filed on Dec. 17, 2021, now U.S. Pat. No. 11,720,491. The contents of the above applications are all incorporated by reference as if fully set forth herein in their entirety.

FIELD AND BACKGROUND OF THE INVENTION

Some embodiments described in the present disclosure relate to memory management and, more specifically, but not exclusively, to management of memory accessed by a plurality of execution threads.

Cache memory is a memory area used to store copies of data from a main memory area. Cache memory is typically smaller and faster than the main memory and in some computerized systems is used to reduce the average time it takes a hardware processor to access data from the main memory area. It is common practice to store in cache memory copies of data from frequently accessed locations in the main memory. A cache memory may store copies of computer instructions executed by the hardware processor. A cache memory may store copies of program data of one or more programs executed by the hardware processor.

When a copy of data from a memory location of the main memory is stored in the cache memory it is said that the memory location is cached. Access time to a cached memory location is significantly faster than access time to a memory location that is not cached, thus to reduce average access time to memory there is a need to increase the likelihood that when the hardware processor accesses a memory location the memory location is already cached. Access to a cached memory location is also called a cache hit. To reduce average access time to memory there is a need to increase the likelihood of a cache hit.

There exists an assumption that the likelihood of referencing a memory location is higher when some other memory location near the memory location was referenced shortly beforehand. For example, the sequential nature of computer instructions increases the likelihood that consecutive computer instructions reside consecutively in main memory, and thus after referencing a memory location storing one computer instruction the hardware processor will reference a consecutive memory location storing a consecutive computer instruction. Similarly, when processing a data object stored consecutively in a main memory, after accessing one element of the data object there is an increased likelihood the hardware processor will access another element of the data object. This assumption is sometimes referred to as "spatial locality".

In some systems the cache memory is divided into a plurality of cache lines, each for storing a copy of a physically consecutive part of the main memory. Each cache line may be associated with a different part of the main memory; two consecutive cache lines may store copies of two separate (non-consecutive) areas of the main memory. Under the assumption of spatial locality, when the hardware processor accesses a memory location that is not cached (also called a cache miss), when copying data from the memory location into a cache line additional data from nearby locations immediately preceding, and additionally or alternatively immediately following the memory location, are copied into the cache line as there is a high likelihood that the hardware processor will access at least one of the nearby locations shortly after accessing the memory location. Under the assumption of spatial locality, copying data from the memory location and its vicinity increases the likelihood of a cache hit in a future access to memory. According to some cache management methods, when a hardware processor accesses a new memory location that is not cached and the cache memory is full, one or more of the cache memory's cache lines is released and data is copied from the new memory location and its vicinity into one or more of the released cache lines.

In computer programming, a process is an active computer program, i.e. a computer program under execution and comprises, in addition to program code, also a memory stack of the process, a program instruction counter etc. In computer programming, an execution thread is a set of instructions of a computer program that can be scheduled and executed by one or more hardware processors independently of other parts of the computer program. A thread may be seen as a lightweight process that can be managed independently by a scheduler. When a plurality of execution threads, possibly of more than one computer program, access a common main memory, each execution thread may access a different location of the main memory. When the plurality of execution threads execute concurrently, spatial locality may be reduced as there may be consecutive accesses to the main memory from more than one execution thread, each accessing a different location of the main memory.

SUMMARY OF THE INVENTION

It is an object of some embodiments disclosed herein to describe a system and a method for caching memory.

The foregoing and other objects are achieved by the features of the independent claims. Further implementation forms are apparent from the dependent claims, the description and the figures.

According to a first aspect, a method for caching memory comprises: caching, in a cache memory for accessing a physical memory area connected to at least one hardware processor, the cache memory comprising a plurality of cache lines each having a cache line amount of bits, at least two data values, each of one of at least two ranges of application memory addresses, each associated with one of a set of execution threads having an identified order of threads and executed by the at least one hardware processor, by: organizing a plurality of sequences of consecutive address sub-ranges, each sequence associated with one of the set of execution threads and consisting of a consecutive sequence of application memory address sub-ranges of the respective range of application memory addresses associated with the execution thread, each application memory address sub-range having an identified amount of memory bits less than the amount of cache line bits, in an interleaved sequence of address sub-ranges by alternately selecting, for each execution thread in the identified order of threads, a next address sub-range in the respective sequence of address sub-ranges associated therewith; generating a mapping of the interleaved sequence of address sub-ranges to a range of physical memory addresses in order of the interleaved sequence of address sub-ranges; and when an execution thread of the set of execution threads accesses an application memory address of the respective range of application memory addresses associated thereof: computing a target memory address according to the mapping using the application memory address; and storing the at least two data values in one cache line of the plurality of cache lines by accessing the physical memory area using the target memory address. Interleaving the plurality of sequences of consecutive sequences of application memory address sub-ranges when mapping the plurality of sequences to a range of physical memory addresses allows sharing at least one physical page of memory between the set of execution threads and thus storing the at least two data values, that are each associated with one of the set of execution threads, in one cache line. Storing the at least two data values that are each associated with one of a set of execution threads in a one cache line increases the likelihood of a cache hit when executing the set of execution threads, thus reducing the average access time to memory.

According to a second aspect, a system for caching memory comprises at least one hardware processor adapted for: caching, in a cache memory for accessing a physical memory area connected to at least one other hardware processor, the cache memory comprising a plurality of cache lines each having a cache line amount of bits, at least two data values, each of one of at least two ranges of application memory addresses, each associated with one of a set of execution threads having an identified order of threads and executed by the at least one other hardware processor, by: organizing a plurality of sequences of consecutive address sub-ranges, each sequence associated with one of the set of execution threads and consisting of a consecutive sequence of application memory address sub-ranges of the respective range of application memory addresses associated with the execution thread, each application memory address sub-range having an identified amount of memory bits less than the amount of cache line bits, in an interleaved sequence of address sub-ranges by alternately selecting, for each execution thread in the identified order of threads, a next address sub-range in the respective sequence of address sub-ranges associated therewith; generating a mapping of the interleaved sequence of address sub-ranges to a range of physical memory addresses in order of the interleaved sequence of address sub-ranges; and when an execution thread of the set of execution threads accesses an application memory address of the respective range of application memory addresses associated thereof: computing a target memory address according to the mapping using the application memory address; and storing the at least two data values in one cache line of the plurality of cache lines by accessing the physical memory area using the target memory address.

With reference to the first and second aspects, in a first possible implementation of the first and second aspects for at least one of the set of execution threads the respective range of application memory addresses associated thereof is one of: the range of physical memory addresses, and a range of virtual memory address. Optionally, the target memory address is a target physical memory address. Optionally, the target memory address is a linear virtual memory address. Optionally, the method further comprises: computing another target physical memory address using the linear virtual memory address; and accessing the physical memory area using the other target physical memory address instead of using the target memory address.

With reference to the first and second aspects, in a second possible implementation of the first and second aspects accessing the physical memory area using the target memory address comprises retrieving a cache line amount of bits from the physical memory area. Optionally, the execution thread accesses the application memory address of the respective range of application memory addresses to retrieve the identified amount of memory bits from the physical memory area. Retrieving a cache line amount of bits from the physical memory area stores the at least two data values that are each associated with one of a set of execution threads in a one cache line, increasing the likelihood of a cache hit when executing the set of execution threads, thus reducing the average access time to memory.

With reference to the first and second aspects, in a third possible implementation of the first and second aspects each of the set of execution threads has an identification value according to the identified order of threads. Optionally, computing the target memory address comprises: inserting into a binary representation of the target memory address an identified amount of lower bits of the application memory address, and inserting into the binary representation of the target memory address a lane value indicative of the respective identification value of the execution thread. Inserting into the binary representation of the target memory address an identified amount of lower bits of the application memory address and a lane value indicative of the respective identification value of the execution thread facilitates identifying an offset in the cache line that is associated with the execution thread, and not associated with another execution thread in the same cache line. Optionally, the physical memory area is organized in a plurality of physical memory pages, each having an amount of physical page bytes. Optionally, the identified amount of lower bits is a base 2 log of the amount of physical page bytes. Optionally, the identified amount of lower bits of the application memory address are inserted into a low part of the binary representation of the target memory address. Optionally, the lane value is inserted into the binary representation of the target memory address immediately following the identified amount of lower bits of the application memory address. Optionally, computing the target memory address further comprises rotating the identified amount of lower bits of the application memory address and the lane value. Optionally, rotating the identified amount of lower bits and the lane value is rotating to the right by a base-2 log of the identified amount of memory bits. Inserting the identified amount of lower bits of the application memory address into the low part of the binary representation of the target memory address, inserting the lane value immediately following the identified amount of lower bits of the application memory address, and rotating the identified amount of lower bits and the lane value allow identifying the offset in the cache line that is associated with the execution thread using existing caching circuitry, reducing cost of implementation of a cache according to the present disclosure compared to using bespoke caching circuitry.

With reference to the first and second aspects, in a fourth possible implementation of the first and second aspects the set of execution threads are selected from a plurality of execution threads executed by the at least one hardware processor. Optionally, the set of execution threads is selected from the plurality of execution threads according to a plurality of statistical values collected while executing the plurality of execution threads. Optionally, the plurality of statistical values comprises at least one of: an amount of accesses to an application memory address, an order of accesses to a plurality of application memory addresses, an association between an application memory address and a thread identification value, and an amount of application memory in an application memory area. Selecting the set of execution threads according to the plurality of statistical values collected while executing the plurality of execution threads increases the likelihood of a cache hit when executing the set of execution threads, thus reducing the average access time to memory.

With reference to the first and second aspects, in a fifth possible implementation of the first and second aspects the method further comprises: selecting from the plurality of execution threads another set of execution threads having another order of threads, each associated with one of at least two other ranges of application memory addresses; organizing another plurality of sequences of consecutive address sub-ranges, each sequence associated with one other of the other set of execution threads and consisting of another consecutive sequence of application memory address sub-ranges of the respective range of application memory addresses associated with the other execution thread, each other application memory address sub-range having another identified amount of memory bits less than the amount of cache line bits, in another interleaved sequence of address sub-ranges by alternately selecting, for each other execution thread in the identified other order of threads, another next address sub-range in the respective other sequence of address sub-ranges associated therewith; and generating another mapping of the other interleaved sequence of address sub-ranges to the range of physical memory addresses in the other order of the interleaved sequence of address sub-ranges. Optionally, the cache memory comprises a plurality of cache bins and the range of physical memory addresses is associated with one of the plurality of cache bins. Optionally, the range of physical memory addresses comprises a first subrange of the range of physical memory addresses, associated with a first cache bin of the plurality of cache bins, and a second subrange of the range of physical memory addresses, associated with a second cache bin of the plurality of cache bins. Optionally the mapping of the interleaved sequence of address sub-ranges is to the first subrange of the range of physical memory addresses, and the other mapping of the other interleaved sequence of address sub-ranges is to the second subrange of the range of physical memory addresses. Optionally, the first cache bin comprises a first plurality of cache lines each having a first amount of cache bits and the second cache bin comprises a second plurality of cache lines each having a second amount of cache bits. Associating each of two or more sets of execution threads with one of a plurality of cache bins increases the likelihood of a cache hit when executing the plurality of execution threads. Using a plurality of cache bins having different amounts of cache bits in their respective cache lines further increases the likelihood of cache hit when executing the plurality of execution threads, as memory of each set of execution threads is interleaved according to an amount of cache bits the increases a likelihood of a cache hit when executing the set of execution threads.

With reference to the first and second aspects, in a sixth possible implementation of the first and second aspects the at least one other hardware processor is a configurable computation grid.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

Unless otherwise defined, all technical and/or scientific terms used herein have the same meaning as commonly understood by one of ordinary skill in the art to which embodiments. Although methods and materials similar or equivalent to those described herein can be used in the practice or testing of embodiments, exemplary methods and/or materials are described below. In case of conflict, the patent specification, including definitions, will control. In addition, the materials, methods, and examples are illustrative only and are not intended to be necessarily limiting.

BRIEF DESCRIPTION OF THE SEVERAL VIEWS OF THE DRAWING(S)

Some embodiments are herein described, by way of example only, with reference to the accompanying drawings. With specific reference now to the drawings in detail, it is stressed that the particulars shown are by way of example and for purposes of illustrative discussion of embodiments. In this regard, the description taken with the drawings makes apparent to those skilled in the art how embodiments may be practiced.

DESCRIPTION OF SPECIFIC EMBODIMENTS OF THE INVENTION

Figure 1A:
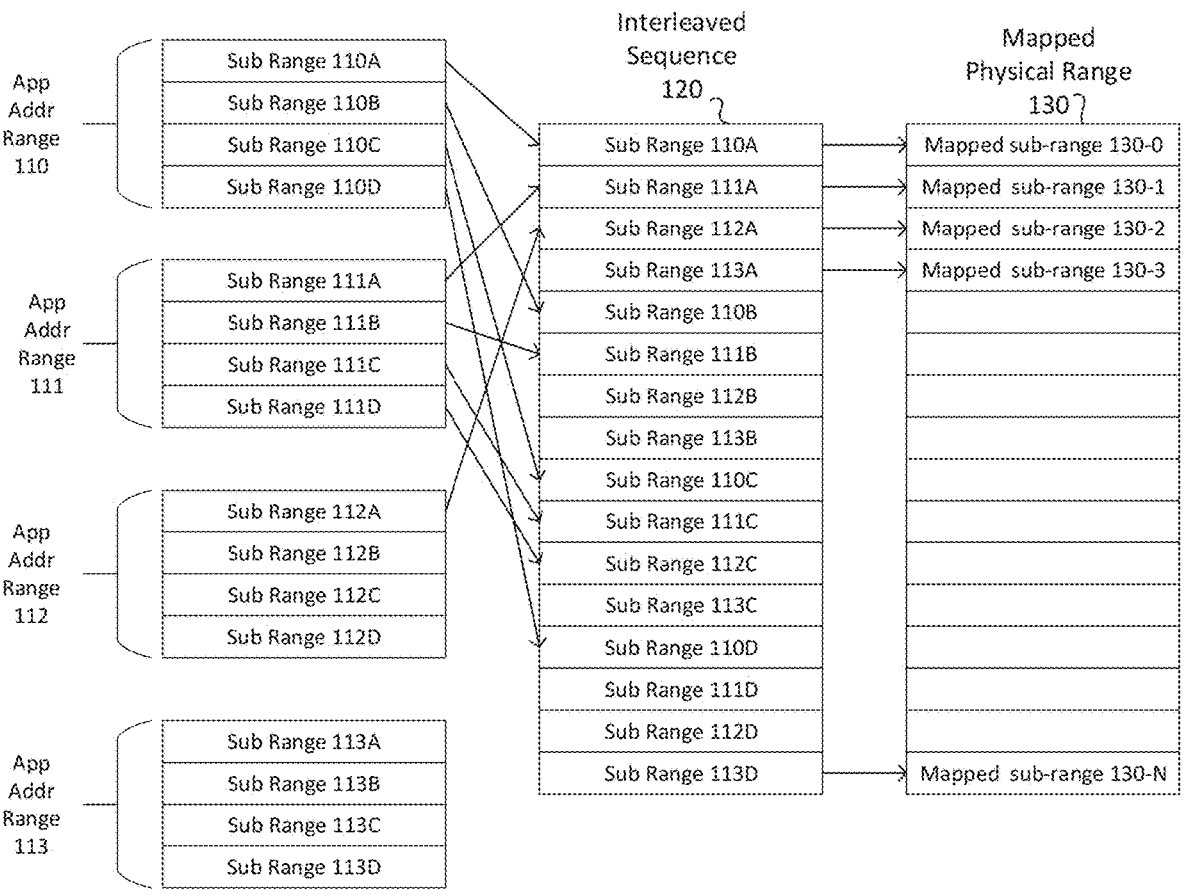
FIGS. 1A, 1B and 1C are block diagrams schematically representing an exemplary interleaving of address sub ranges, according to some embodiments.

As used herewithin, the term "temporal locality" refers to a concept that a memory area that is referenced at one point in time will be referenced again sometime in the near future after the one point in time. As described above, a cache line holds a copy of a physically consecutive memory area of the main memory. Thus, when a sequence of memory accesses is temporally local, i.e. the sequence of memory accesses includes more than one access to a physically consecutive memory area within a relatively short period of time, the likelihood of a cache hit increases as after the first access to the memory area the memory area is cached, at least for some time.

According to some common methods for caching memory, a cache memory area has a plurality of equally sized cache lines each having a cache line amount of bits. When data is copied from the main memory to the cache memory, a cache line amount of physically consecutive bits are retrieved from the main memory and stored in a cache line of the cache memory area. A typical execution thread is associated with one or more ranges of application memory addresses. In some systems an application memory address is a physical memory address, however in many modern systems an application memory address is a virtual memory address and there exists a mapping between each application memory range of the execution thread and one or more ranges of physical memory addresses. When an execution thread accesses an application memory address, a physical memory address is computed according to the mapping and the main memory is accessed using the physical memory address.

According to common practice, a memory area is divided into pages, each having one of an identified set of amounts of bytes (known as page size). Also according to common practice, a cache line does not cross a page boundary, i.e. one cache line stores a copy of data values that have consecutive physical memory addresses in one page of memory.

When consecutive accesses to the main memory are not spatially local, the amount of cache hits is reduced, increasing an average time for accessing memory. When a set of execution threads use a shared physical memory area and are executed concurrently, a likelihood of a cache hit increases as more than one of the set of execution threads may access a cached part of the shared physical memory area. However, in some systems memory usage patterns are such that one physical memory page is not shared by more than one execution thread, for example when the execution threads do not use shared memory. As a result, when a plurality of execution threads is executed concurrently and do not use a shared memory area, spatial locality may be reduced as there may be consecutive accesses to the main memory from more than one execution thread, each accessing a different physical page of the main memory. There is a need to increase the amount of cache hits when concurrently executing a plurality of execution threads.

For brevity, henceforth the term "thread" is used to mean an execution thread, and the terms are used interchangeably.

The present disclosure, in some embodiments described herewithin, proposes increasing a likelihood of a cache hit by storing in one cache line copies of data values accessed by more than one concurrently executed threads. Increasing a likelihood of a cache hit reduces an average access time to memory. To store in one cache line copies of data values accessed by more than one concurrently executed threads when the more than one concurrently executed threads do not use a shared memory area, the present disclosure proposes in some embodiments sharing at least one physical page of memory between a set of concurrently executed threads. Optionally, the at least one physical page of memory is one of a group of physically contiguous physical pages of memory having a common page size.

In such embodiments, the present disclosure proposes interleaving on the at least one physical page of memory data associated with one of the set of concurrently executed threads with other data associated with another of the set of concurrently executed threads, such that copies of at least two data values comprising at least one data value associated with the one thread and at least another data value associated with the other thread, may be copied into one cache line. By interleaving the data and the other data on the at least one physical page, in such embodiments the at least two data values are stored in the at least one physical page of memory and each is accessed by one of the set of concurrently executed threads using a common cache line.

To interleave data associated with the one thread and other data associated the other thread, in some embodiments the present disclosure proposes organizing a plurality of sequences of consecutive address sub-ranges in an interleaved sequence of address sub-ranges, where each sequence of consecutive address sub-ranges is associated with one of a set of threads having an identified order of threads, and consists of a consecutive sequence of application memory address sub-ranges of a range of application memory addresses associated with the thread. Optionally, the plurality of sequences of consecutive address sub-ranges is organized in the interleaved sequence of address sub-ranges by alternately selecting, for each of the set of threads, in the identified order of threads, a next address sub-range in the respective sequence of consecutive address sub-ranges associated with the thread.

Reference is now made to FIG. 1A, showing a block diagram schematically representing an exemplary interleaving 100A of address sub ranges, according to some embodiments. It should be noted that example 100A is a non-limiting example, representing an exemplary interleaving of four sequences of application memory address sub-ranges. It should be emphasized that the methods and systems described in the present disclosure are not limited to embodiments having four threads and may be applied to any other amount of threads and ranges of application memory address sub-ranges.

In some embodiments, a set of four threads is optionally identified in a plurality of threads executing on one or more hardware processors. Optionally, the set of four threads has an identified order of threads. Optionally, each of the set of four threads is associated with a range of application memory addresses, for example application address range 110, application address range 111, application address range 112 and application address range 113, in the identified order of threads. Optionally, each range of application memory addresses comprises a sequence of consecutive address sub-ranges, where each sequence of consecutive address sub-ranges consists of a sequence of application memory address sub-ranges of the respective range of application memory addresses. In this example, application address range 110 comprises the sequence of sub-range 110A, sub-range 110B, sub-range 110C and sub-range 110D. Similarly, in this example application address range 111 comprises the sequence of sub-range 111A, sub-range 111B, sub-range 111C and sub-range 111D, application address range 112 comprises the sequence of sub-range 112A, sub-range 112B, sub-range 112C and sub-range 112D, and application address range 113 comprises the sequence of sub-range 113A, sub-range 113B, sub-range 113C and sub-range 113D.

According to some embodiments, the present disclosure proposes organizing application address range 110, application address range 111, application address range 112 and application address range (henceforth referred to collectively as the plurality of application address ranges) in interleaved sequence of address sub-ranges 120. Optionally, the plurality of application address ranges is organized in interleaved sequence 120 by alternately selecting from each of the plurality of application address ranges, in the identified order of threads, a next address sub-range. Thus, in this example, sub-range 110A of application address range 110 is added first to interleaved sequence 120, followed by sub-range 111A of application address range 111, then sub-range 112A of application address range 112, and then sub-range 113A of application address range 113. The sequence of sub-range 110A, sub-range 111A, sub-range 112A and sub-range 113A may be considered one group of interleaved sub-ranges. Next, sub-range 110B of application address range 110 is added, followed by sub-range 111B of application address range 111, then sub-range 112B of application address range 112, and then sub-range 113B of application address range 113, and so forth. Similarly, the sequence of sub-range 110B, sub-range 111B, sub-range 112B and sub-range 113B may be considered one other group of interleaved sub-ranges.

In such embodiments, interleaved sequence of address sub-ranges 120 is mapped to a range of physical memory addresses, in order of interleaved sequence of address sub-ranges 120. For example, interleaved sequence 120 is mapped to mapped physical range 130 of physical memory addresses. In this example, mapped physical range 130 consists of a sequence of consecutive sub-ranges of physical memory addresses, for example including mapped physical sub-range 130-0, mapped physical sub-range 130-1, mapped physical sub-range 131-2, and mapped physical sub-range 130-N. In this example, sub-range 110A is mapped to mapped physical sub-range 130-0; sub-range 111A which is consecutive to sub-range 110A in interleaved sequence 120 is mapped to mapped physical sub-range 130-1 which is consecutive to mapped physical sub-range 130-0 in mapped physical range 130. Similarly, in this example sub-range 112A is mapped to mapped physical sub-range 130-2, sub-range 113A is mapped to mapped physical sub-range 130-3, and so forth in order of interleaved sequence 120 until sub-range 113-D is mapped to mapped physical sub-range 130-N.

For brevity, henceforth the term "memory" is used to mean "physical memory area" unless otherwise stated, and the terms are used interchangeably.

Figure 1B:
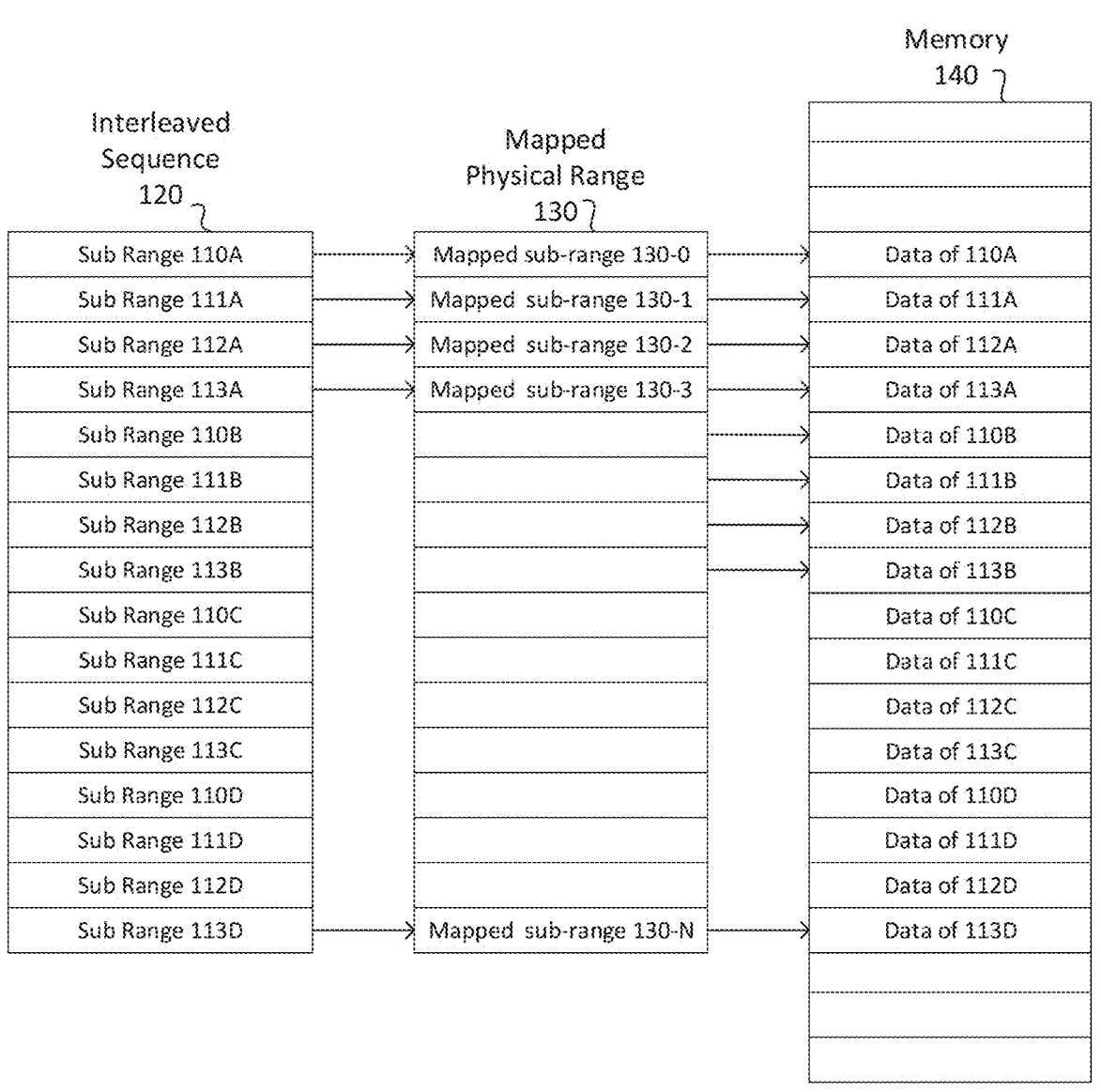

Optionally, data values are stored in physical memory according to the mapping between interleaved sequence 120 and mapped physical range 130. Reference is now made also to FIG. 1B, showing a block diagram schematically representing an extension 100B of interleaving 100A, according to some embodiments. In this example, data of sub-range 110A is stored in physical memory area 140 at a location addressed by mapped sub-range physical 130-0, to which sub-range 110A is mapped. Similarly, data of sub-range 111A is stored in memory 140 at another location addressed by mapped physical sub-range 130-1, to which sub-range 111A is mapped. As mapped sub-range physical 130-1 is consecutive to mapped sub-range physical 130-0, data of sub-range 111A is consecutive to data of sub-range 110A in memory 140. Similarly, data of sub-range 112A is consecutive to data of sub-range 111A in memory 140, followed by data of sub-range 113A, with data of sub-range 110B consecutive to data of sub-range 113A, data of sub-range 111B consecutive to data of sub-range 110B and so forth. Thus, in this example, memory associated with four threads is interleaved when stored in a common page of physical memory. Further in this example, to store four pages of memory, each associated with one of the four threads, four common pages of physical memory are needed, each storing some of the respective memory associated with one of the four threads, interleaved therebetween.

Optionally, mapped physical range 130 spans more than one physically contiguous page of memory in memory 140. Optionally, mapped physical range 130 spans a group of physically contiguous pages of physical memory in memory 140, having a common page size.

Figure 1C:
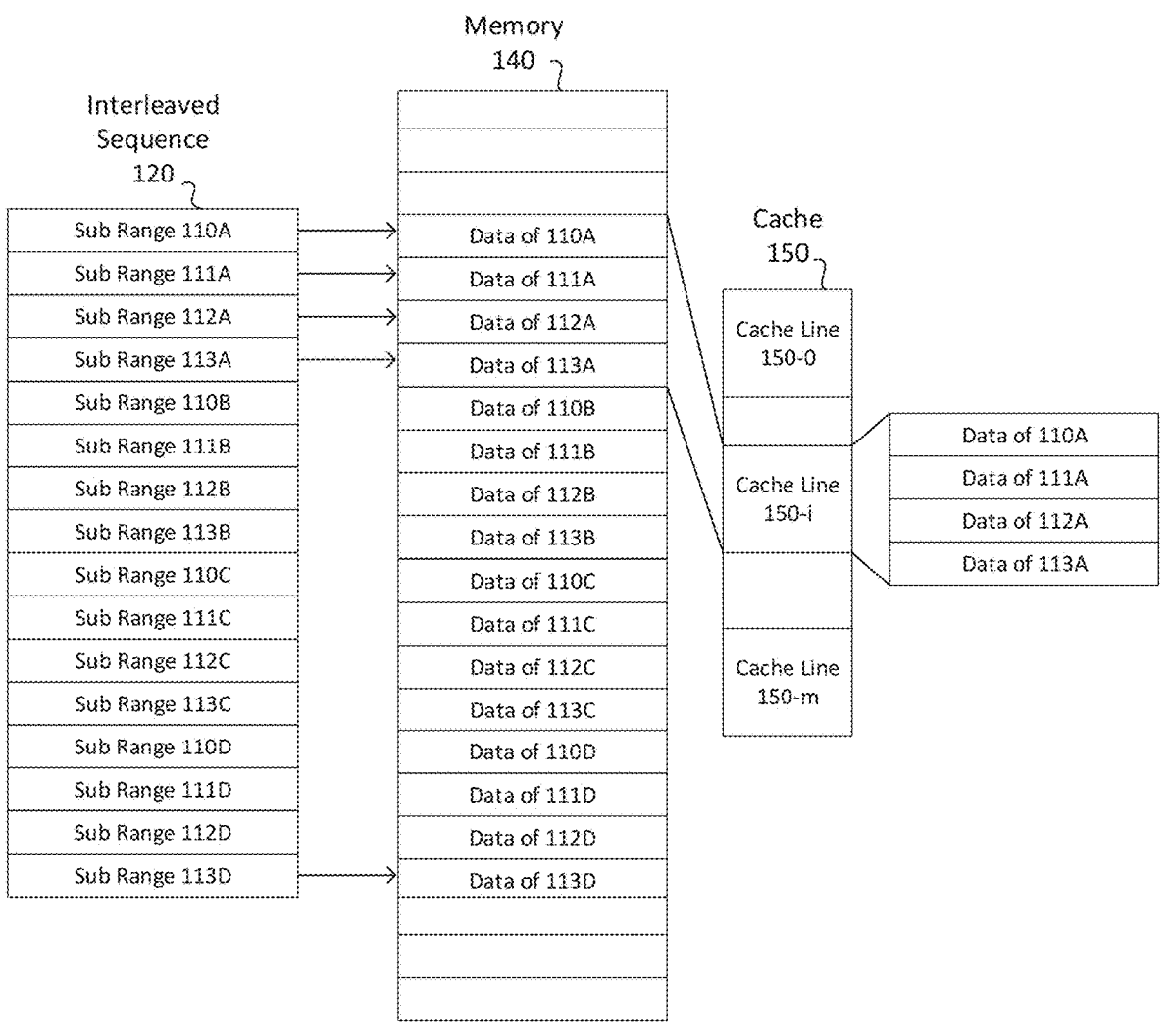

Optionally, a cache is used when accessing memory 140, addressed by mapped physical range 130 of physical memory addresses. Reference is now made also to FIG. 1C, showing a block diagram schematically representing another extension 100C of interleaving 100A and interleaving 100B, according to some embodiments. In this example, cache 150 comprises a plurality of cache lines, including cache line 150-0, cache line 150-*i* and cache line 150-*m*, where m denotes an amount of cache lines in the plurality of cache lines of cache 150. In this example, when a thread associated with application address range 111 accesses data in sub-range 111A which is mapped to mapped physical sub-range 130-1, physical memory addressed by mapped physical sub-range 130-1 is copied into cache 150 if not already there. As memory is copied into cache 150 in full cache lines, an entire cache line comprising data from physical memory at location mapped physical sub-range 130-1 is retrieved from memory 140 and stored in one cache line, for example cache line 150-*i*. In this example, data from mapped physical sub-range 130-0, mapped physical sub-range 130-1, mapped physical sub-range 130-2 and mapped physical sub-range 130-3 are copied as one cache line into cache line 150-*i*. As long as cache line 150-*i* is not reused to cache another area of memory 150, when another thread associated with application address range 112 accesses data in sub-range 112A, the access may be served by cache line 150-*i*. Thus, according to this example copying from memory 140 into cache line 150-*i* stores in cache line 150-*i* at least two data values where each is of one of at least two ranges of application memory addresses, where each range of application memory addresses is associated with one of the set of execution threads and is accessed thereby.

Optionally, to access an application memory address, a target memory address is computed using the application memory address, according to the mapping. Optionally, the target memory address is a target physical memory address. For example, to access an application memory address in application address sub-range 111A, the target memory address may be a target physical memory address in mapped physical sub-range 130-1. Optionally, the target memory address is a linear virtual address, i.e. an address mapped without segmentation, and to access the physical memory area another target physical memory address is computed using the linear virtual memory address.

Optionally, the set of threads are selected from the plurality of execution threads according to a plurality of statistical values, collected while executing the plurality of execution threads, for example an amount of accesses to an application memory address and an order of accesses to a plurality of application memory addresses. Using a plurality of statistical values to select the set of threads facilitates mapping a plurality of application memory address ranges of the set of threads to one or more common physical pages using interleaving as described above such that a likelihood of a cache hit is increased, thus reducing an average memory access time.

In addition, in some embodiments the above described method may be repeated for one or more other sets of threads, such that memory associated with each set of threads is interleaved in one or more physical memory pages. Optionally, each of the other sets of threads are selected from the plurality of threads according to the plurality of statistical values.

In the field of computing, a page table is a data structure used by an operating system to store a mapping between virtual addresses of memory pages and the respective physical addresses of the memory pages. Each mapping between a virtual address of a page and a physical address of the page is known as a page table entry (PTE). A PTE typically comprises an indication whether the memory page referenced thereby has been modified, also known as being dirty. There exists a practice, in some systems, to organize virtual memory translation in a hierarchy of page tables, where each PTE in a high level page table points to one of a plurality of lower level page tables. In such systems, the virtual address may be segmented, where each segment of the virtual address is used as an index of a page table in one of the hierarchies. Finding a translation of a virtual memory address to a physical memory address in a page table of such systems involves reading one or more memory locations, one for each of the hierarchy of page tables. This process is also known as a page walk.

There exist systems where more than one page size is supported simultaneously, such that one thread executing in a system uses physical memory having a first page size and another thread executing in the system uses physical memory having a second page size which is different than the first page size. In some existing systems the size of a page referenced by a PTE of a page table is implicit, where each PTE in the page table, or in an identified area of the page table, references an identified page size. The page size may be identified according to the level of the page table in its respective hierarchy. In such systems, when a system supports more than one page size there may exist more than one page table or the page table may be divided into distinct areas. In some systems, a system supports more than one page size by having more than one level in the page table hierarchy. In some systems, each process executing in the system has their own page table, or their own page table hierarchy.

A translation lookaside buffer (TLB) is a memory cache that stores recent translations of virtual memory addresses to physical memory addresses and is used in some systems to reduce the time it takes to access a memory location. A TLB typically comprises a plurality of TLB entries, each comprising a translation of a virtual memory address to a physical memory address. In such systems, accessing a virtual memory address comprises searching a TLB for the virtual memory address and retrieving a respective physical memory address which is used to access memory. A TLB hit is when a virtual memory address is found in the TLB and a respective physical memory address is retrieved. When the virtual memory address is not found in the TLB this is known as a TLB miss. In such systems, when a TLB miss occurs when translating a virtual address, translation proceeds by looking for the virtual memory address in a page walk of the page table or hierarchy of page tables. After the physical memory address is determined by the page walk, the virtual address to physical address mapping is entered into the TLB. To reduce access time to memory there is a need to increase an amount of TLB hits. A common method of accessing a TLB involves computing a hash function using the virtual memory address. However, there may be a high amount of hash collisions, where multiple virtual memory addresses map to a common hash result. A hash collision when accessing the TLB causes eviction of the corresponding entry in the TLB, reducing utilization of the TLB. There is a need to reduce an amount of hash collisions in the TLB.

In some systems the TLB is organized in a hierarchy of TLBs. In systems where each supported page size requires a separate page table, there is also a need for a separate TLB for each page size, possible in more than one hierarchy of the TLB.

In some embodiments described herewithin, each of two sets of threads of the plurality of threads may use a different page size. In such embodiments, one or more first physical memory pages of a first set of threads of the plurality of threads has a first page size and one or more second physical memory pages of a second set of threads of the plurality of threads has a second page size where the first page size and the second page size are different.

To increase utilization of the TLB, in some embodiments the present disclosure additionally proposes using each TLB entry of the plurality of TLB entries to reference more than one contiguous physical page, and thus reference an effective physical page formed by the combination of the more than one contiguous physical page and having an effective physical address range. To do so, in such embodiments the present disclosure proposes encoding each PTE to reference the effective physical page consisting of the more than one contiguous physical page. Encoding in one PTE a reference to more than one physical memory page increases the likelihood of a TLB hit and reduces an amount of hash collisions in the TLB. Using one PTE to reference an effective physical page consisting of a set of memory pages interleaving memory associated with a set of threads further increases the likelihood of a TLB hit as the set of threads may be selected to increase temporal proximity of memory accesses.

To reference a set of memory pages in one TLB entry, the present disclosure proposes, in some embodiments, encoding in the PTE a hint indicative of an amount of contiguous physical memory pages referenced by the PTE. Optionally, the hint is encoded in one or more bits of a binary representation of the virtual address in the PTE. Encoding the hint in one or more bits of the binary representation of the virtual address in the PTE facilitates carrying the hint untranslated into a respective entry in the TLB, corresponding with the PTE, thus allowing one TLB entry to reference an effective physical address range consisting of more than one contiguous physical memory pages and allowing one TLB to support access to more than one effective page size of memory. Optionally, the page table comprises a separate PTE for each of the one or more contiguous physical memory pages. However, when an address in one of the more than one contiguous physical memory pages is accessed, a TLB entry reflecting an address translation for the address in the one page will be hit when accessing another address in another of the one or more contiguous physical memory pages.

In addition, in some embodiments, the present disclosure proposes that in a TLB, a first TLB entry references a first amount of contiguous physical memory pages each having a first page size and a second TLB entry references a second amount of contiguous memory pages each having a second page size. Thus, the first TLB entry references a first effective physical page having a size of the first amount multiplied by the first page size, and the second TLB entry references a second effective physical page having a size of the second amount multiplied by the second page size. Optionally, the first TLB entry references a first set of memory pages interleaving memory associated with one set of threads of the plurality of threads, and the second TLB entry references a second set of memory pages interleaving other memory associated with another set of threads of the plurality of threads.

In addition, in some embodiments the cache comprises a plurality of cache bins. Optionally, the physical memory is addressed by a plurality of distinct ranges of physical memory addresses. Optionally, each respective range of application addresses of each of a plurality of sets of threads, consisting of the set of threads and the one or more other sets of threads, is mapped to one of the plurality of distinct ranges of physical memory addresses. Optionally, each distinct range of physical memory addresses is associated with one of the plurality of cache bins. Thus, in such embodiments, each of the plurality of sets of threads is associated with one of the plurality of cache bins, and one or more memory accesses of a thread is served by the respective cache bin associated with the thread. Optionally, not all of the plurality of cache bins have a common cache line size, i.e. a cache line amount of bits of one of the plurality of cache bins is different from another cache line amount of bits of another of the plurality of cache lines. Using different cache line amount of bits for different cache bins allows using for each set of threads a cache line size according to a pattern of a plurality of memory accesses, thus increasing likelihood of a cache hit.

Before explaining at least one embodiment in detail, it is to be understood that embodiments are not necessarily limited in its application to the details of construction and the arrangement of the components and/or methods set forth in the following description and/or illustrated in the drawings and/or the Examples. Implementations described herein are capable of other embodiments or of being practiced or carried out in various ways.

Embodiments may be a system, a method, and/or a computer program product. The computer program product may include a computer readable storage medium (or media) having computer readable program instructions thereon for causing a processor to carry out aspects of the embodiments.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of embodiments may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of embodiments.

Aspects of embodiments are described herein with reference to flowchart illustrations and/or block diagrams of methods, apparatus (systems), and computer program products according to embodiments. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 2:
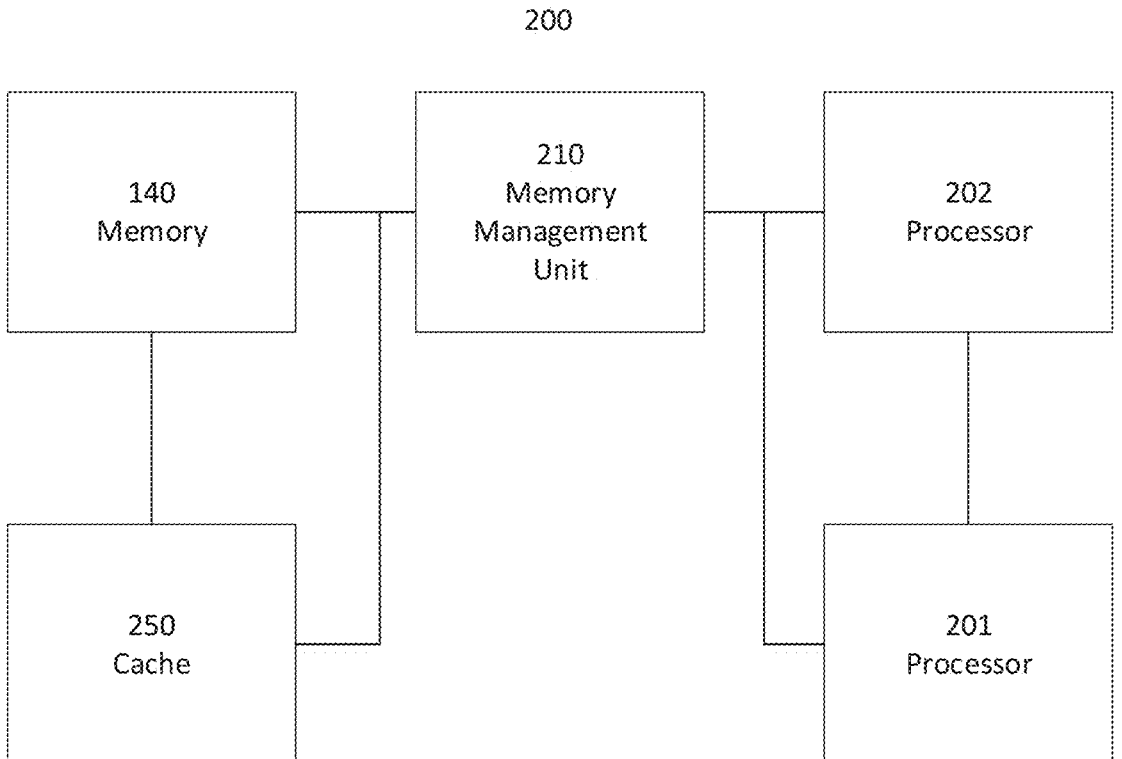
FIG. 2 is a schematic block diagram of an exemplary system, according to some embodiments.

Reference is now made also to FIG. 2, showing a schematic block diagram of an exemplary system 200, according to some embodiments. In such embodiments, at least one hardware processor 201 is connected to physical memory area 140.

For brevity, henceforth the term "processing unit" is used to mean "at least one hardware processor" and the terms are used interchangeably.

Optionally, processing unit 201 is connected to memory 140 via memory management unit 210. Optionally, memory management unit 210 comprises processing circuitry for handling memory and caching operations associated with processing unit 201. Optionally, processing unit 201 is coupled with memory management unit 210, for example via an electrical interface or via a bus.

Optionally, memory 140 is connected to cache memory area 250. For brevity, henceforth the term "cache" is used to mean "cache memory area" and the terms are used interchangeably. Optionally, memory 140 is coupled with cache 250, for example via another electrical interface or another bus. Optionally, memory management 210 is connected to cache 250, optionally via yet another electrical interface or yet another bus. Optionally, memory management unit 210 is connected to cache 250 via the other electrical interface or other bus connecting memory 140 to cache 250. Optionally, cache 250 is a multi-layered cache, having a plurality of cache levels, optionally organized hierarchically. For example, cache 250 may comprise four levels, for example identified as L1, L2, L3 and L4. Any of the methods described herewithin may be applied to any layer, and additionally or alternatively to any combination of layers, of cache 250.

Optionally, the processing circuitry for handling memory and caching operations in memory management unit 210 handles caching of one or more values used when accessing a Translation Lookaside Buffer (TLB). Optionally, at least some of the one or more values used when accessing the TLB are values of one or more PTEs. Optionally, the TLB is cached in cache 250. Optionally, at least some of the one or more values used when accessing the TLB are cached in cache 250.

Optionally, processing unit 201 is connected to another processing unit 202, optionally via one or more digital communication network interfaces. Optionally, processing unit 201 is electrically coupled with other processing unit 202. Optionally, other processing unit 202 is a configurable computation grid, comprising a plurality of configurable computation elements. Optionally, processing unit 201 communicates with other processing unit 202 to configure other processing unit 202 to execute one or more execution threads of a software application executed by processing unit 201. Optionally, for example when other processing unit 202 is a configurable computation grid, configuring other processing unit 202 comprises configuring at least some of the plurality of configurable computation elements.

Optionally, other processing unit 202 is connected to memory 140, optionally via memory management unit 210. Optionally, other processing unit 202 is coupled with memory 140. Optionally, other processing unit 202 is coupled with memory management unit 210, optionally via the memory interface or bus that processing unit 201 is coupled with memory management unit 210.

Optionally, cache 250 comprises a plurality of cache lines. Optionally, each of the plurality of cache lines has a cache line amount of bits, for example 512 bits. Other examples of a cache line amount of bits include, but are not limited to, 1024 bits and 2048 bits.

Optionally, cache 250 comprises a plurality of cache bins. Reference is now made again to FIG. 1A. Optionally, cache 150 is one of the plurality of cache bins of cache 250.

Optionally, processing unit 201 caches in cache 250 two or more data values, each of one of two or more ranges of application memory addresses, each associated with one of a set of execution threads. Reference is made again to FIGS. 1A, 1B and 1C. For example, the set of threads may comprise one thread and associated with application address range 110, and another thread associated with application address range 111. Optionally, processing unit 201 caches data of sub-range 110A and of sub-range 111A in cache line 150-*i*.

Optionally, the set of execution threads are executed by processing unit 201. Optionally, the set of execution threads are executed by other processing unit 202. Optionally, processing unit 201 configures other processing unit 202 to execute the set of execution threads. Optionally, the set of execution threads has an identified order of threads.

To cache the two or more data values, in some embodiments, system 200 executes the following non-mandatory method.

Figure 3:
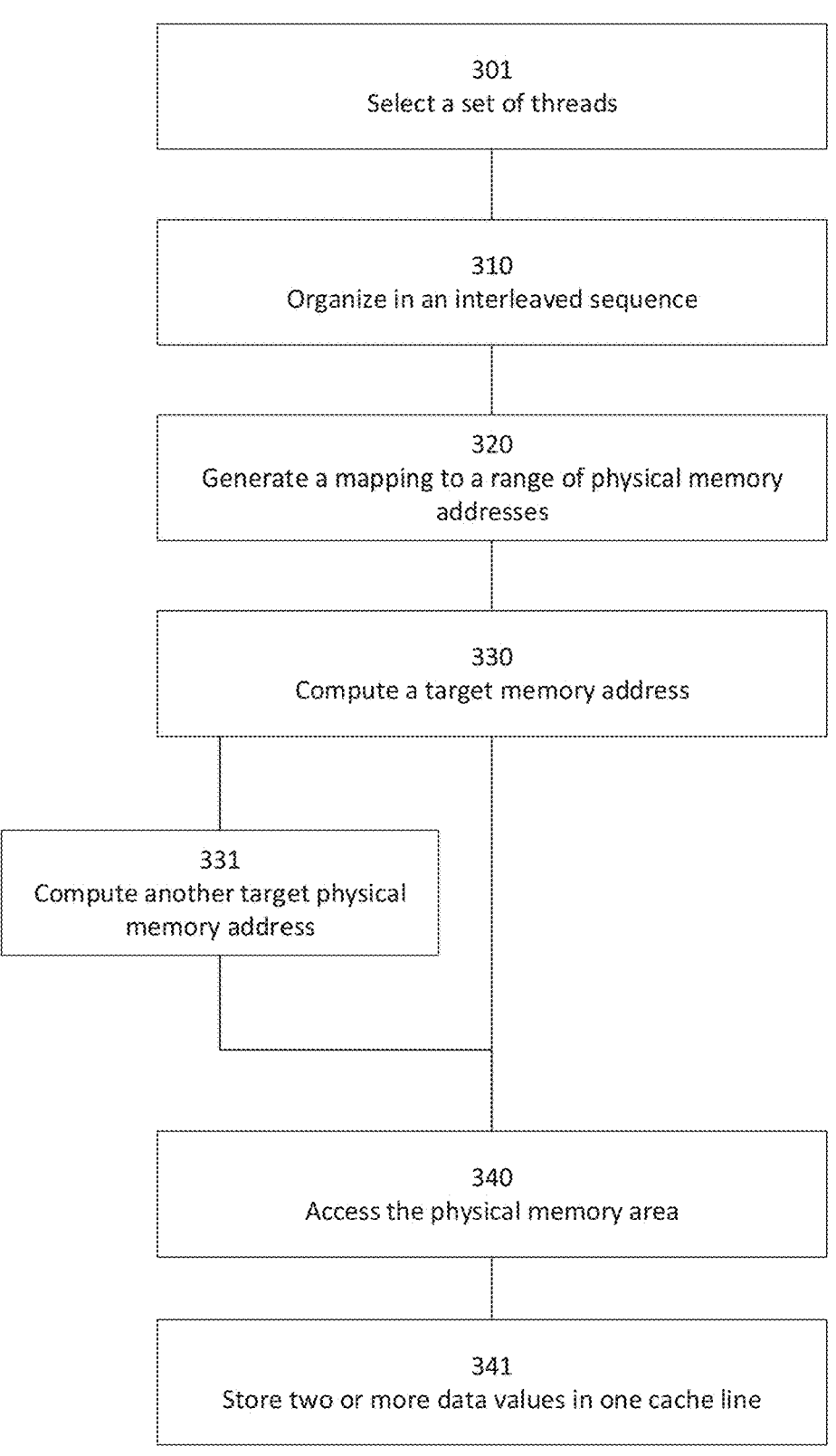
FIG. 3 is a flowchart schematically representing an optional flow of operations for caching, according to some embodiments.

Reference is now made also to FIG. 3, showing a flowchart schematically representing an optional flow of operations 300 for caching, according to some embodiments. In such embodiments, in 310 processing unit 201 optionally organizes a plurality of sequences of consecutive address sub ranges, for example application address range 110, application address range 111, application address range 112 and application address range 113 in interleaved sequence of address subranges 120. Optionally, each address sub-range of each of the plurality of application address sub ranges has an identified amount of memory bits which is less than the amount of cache line bits. For brevity, henceforth the term "step size" is used to mean the identified amount of memory bits. Optionally, the step size is an amount of memory bits cached consecutively in one cache line and associated with one thread of the set of threads, i.e. a size of an interleaving step in a cache line. Some examples of a step size include, but are not limited to, 128 bits and 64 bits. Optionally, the identified amount of cache line bits is a multiple of the step size by an integer number. Optionally, the identified amount of cache line bits is a multiple of the step size by an amount of threads in the set of threads. For example, when the amount of cache line bits is 1024, in one example the step size may be 256 bits, in another example the step size may be 128 bits, and in yet another example the step size may be 512 bits. To organize the plurality of sequences of consecutive address sub-ranges in interleaved sequence of address sub-ranges 120, processing unit 201 optionally selects, alternately for each thread in the identified order of threads, a next address sub-range in the respective sequence of address sub-ranges associated with the thread.

Optionally, at least one of the application memory address ranges is a range of application physical addresses. For example, application address range 110 may be a range of application physical addresses in memory 140. Optionally, at least one of the application memory address ranges is a range of application virtual addresses. For example, application address range may be a range of application virtual addresses.

In 320, processing unit 201 optionally generates a mapping between interleaved sequence 120 and mapped physical range 130 of physical memory addresses in memory 140. Optionally, the mapping is in the order of interleaved sequence of address sub-ranges 120, such that sub-range 111A, which is consecutive to sub-range 110A in interleaved sequence of address sub-ranges 120, is mapped to mapped physical sub-range 130-1 and sub-range 110A is mapped to mapped physical sub-range 130-0, where mapped physical sub-range 130-1 is consecutive to mapped physical sub-range 130-1 in mapped physical range 130.

The following description pertains to an embodiment where the set of threads are executed by other processing unit 202. The same steps may be executed by processing unit 201 when the set of threads are executed by processing unit 201.

When an execution thread of the set of execution threads accesses an application memory address of the respective range of application memory addresses associated with the execution thread, for example when a thread accesses an application memory address in sub-range 111A, other processing unit 202 computes in 330 a target memory address according to the mapping, using the application memory address, and in 340 optionally accesses memory 140 using the target memory address. Optionally, the thread accesses memory 140 to retrieve a step size amount of memory bits from memory 140. Optionally, other processing unit 202 accesses memory 140 via memory management unit 210. Optionally, accessing memory 140 comprises retrieving a full cache line from memory 140, i.e. retrieving from memory 140 the cache line amount of bits from memory 140. In 341, two or more values, for example data of 110A, data of 111A, data of 112A and data of 113A are optionally stored in cache-line 150-i, optionally by memory management unit 210.

Optionally, the target memory address is a target physical memory address and in 340 other processing unit 202 accesses memory 140 using the target physical memory address.

Optionally, the target memory address is a linear virtual address. For example, when each of two or more of the set of threads are associated with a common range of application virtual addresses, a plurality of application virtual addresses of the set of threads may be mapped to a contiguous range of linear virtual addresses, such that each of the set of threads is mapped to a unique sub-range of the contiguous range of linear virtual addresses.

In the field of computing, a page table is a data structure used to store mappings between a plurality of virtual addresses and a plurality of physical addresses. Optionally, other processing unit 202 computes the target memory address in 330 by providing the application memory address to a TLB and additionally or alternatively to a page table.

In the field of computing, the term "memory paging" (or "paging" for short) refers to a memory management scheme where data is stored and retrieved from a secondary storage for use in a main memory, for example memory 140. A secondary storage may be a non-volatile digital storage, for example a hard disk or a solid-state disk. When system 200 uses memory paging, more than one virtual address may be mapped to one physical address. When system 200 supports memory paging and the application memory address is a virtual memory address, the physical address may be an outcome of providing the virtual memory address to the TLB and additionally or alternatively to the page table. Optionally, when the target memory address is a linear virtual address, the linear virtual address is the outcome of providing the application memory address to the TLB and additionally or alternatively to the page table.

When the target memory address is a linear virtual address, in 331 other processing unit computes in 341 another target physical memory address using the linear virtual memory address and in 340 accesses memory 140 optionally using the other target physical memory address instead of the target memory address computed in 330.

Optionally, each of the set of execution threads has an identification value according to the identified order of threads, henceforth referred to as a lane value. Optionally, the identification value of a thread is an ordinal number of the thread in the identified order of threads.

Figure 4:
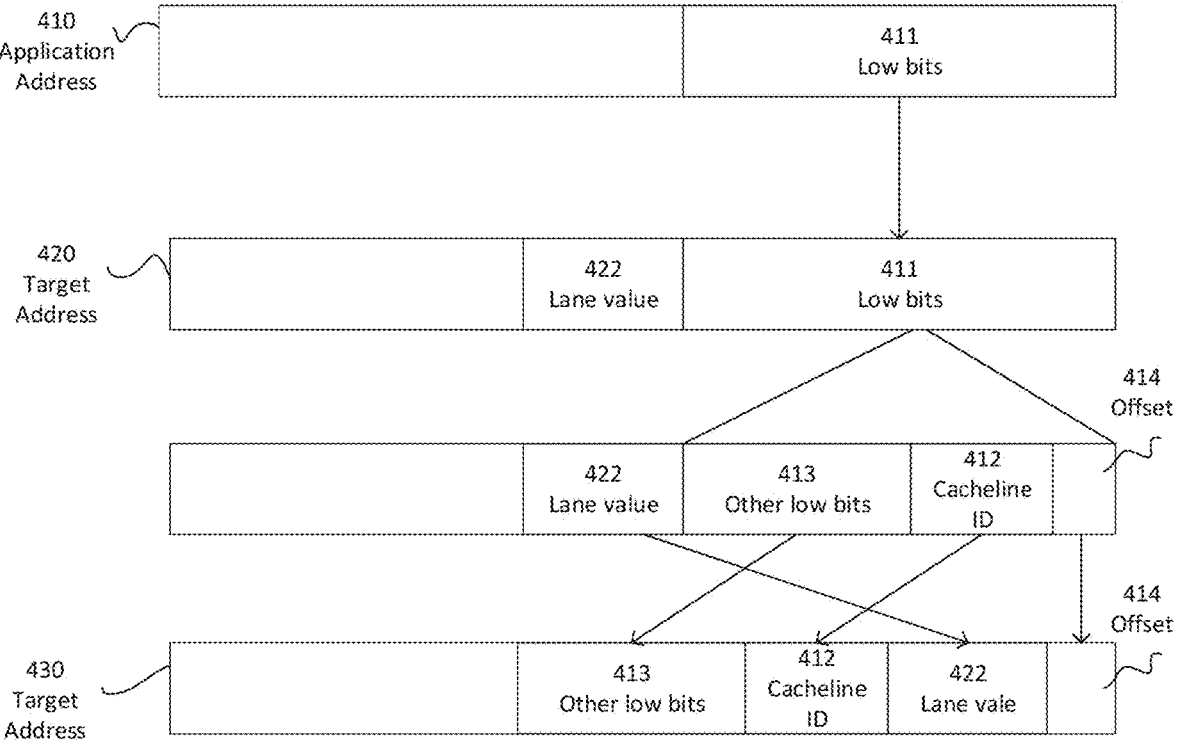
FIG. 4 is a block diagram schematically representing an exemplary address mapping, according to some embodiments.

Reference is now made also to FIG. 4, showing a block diagram schematically representing an exemplary address mapping 400, according to some embodiments. In such embodiments, application memory address 410 comprises low bits 411, having an identified amount of least significant bits of application memory address 410. Optionally, memory 140 is organized in a plurality of physical memory pages. Optionally, each of the plurality of physical memory pages has an amount of physical page bytes, for example 1024, 2048, 512, and 8192. Optionally, an amount of bits of low bits 411 is a base 2 log of the amount of physical page bytes. For example, when the amount of physical page bytes is 1024, the amount of bits in low bits 411 may be 10. In another example, when the amount of physical page bytes is 4096, the amount of bits in low bits 411 may be 12.

Optionally, computing the target memory address comprises inserting low bits 411 into a binary representation of the target memory address 420, optionally into a low part of binary representation of the target memory address 420. Optionally, computing the target memory address comprises inserting lane value 422 of the respective thread associated with application memory address 410 into binary representation of the target memory address 420, optionally immediately following low bits 411.

Optionally, low bits 411 comprise a cache line identifier 412, indicative of a cache line of the plurality of cache lines of cache 250 intended to store a copy of a data value of memory 140 at location application memory address 410. Optionally, low bits 411 further comprise an offset value 414 indicative of an offset in a step size amount of data retrieved from memory 140 according to application memory address 410. Optionally, low bits 411 further comprises other low bits 413.

Optionally, computing the target memory address further comprises rotating low bits 411 and lane value 422. For example, to produce target memory address 430, the sequence of cache line identifier 412, other low bits 413 and lane value 422 have been rotated to the right by an amount of bits in cache line identifier 412 and other low bits 413. Optionally, rotating low bits 411 and lane value 422 is rotating to the right by a base-2 log of the step size.

For example, when accessing sub-range 111A lane value 422 is indicative of a second thread of the set of threads. In this example, lane value 422 is in lower bits of target address 430 than cache identifier 412, serving to identify an offset in a cache line associated with sub-range 111A, and not with sub-range 110A or 112A.

Reference is now made again to FIG. 3. Optionally, in 301 processing unit 201 selects the set of threads from a plurality of threads. Optionally, the plurality of threads is executed by one or more of processing unit 201 and other processing unit 202. Optionally, processing unit 201 selects the set of threads from the plurality of threads according to a plurality of statistical values. Some examples of a statistical value are: an amount of accesses to an application memory address, an order of accesses to a plurality of application memory addresses, an association between an application memory address and a thread identification value, and an amount of application memory in an application memory area. Optionally, the plurality of statistical values is used to identify the set of threads such that when the set of threads are executed concurrently and when respective application memory ranges associated with the set of threads is interleaved in physical memory a likelihood of a cache hit is increased. When more than one thread shares a similar access pattern, using one or more shared cache lines for the more than one thread increases a likelihood of a cache hit. When the more than one thread use a common memory access size, there is a greater likelihood that when the more than one thread share a cache line there will be a cache hit.

When system 200 supports memory paging, the plurality of statistical values is optionally used to identify the set of threads such that a likelihood of a cache hit is increased when more than one virtual address is mapped to one physical address.

In some embodiments, sharing a cache line may be done for more than one set of threads, where each set of threads shares a cache line. In such embodiments, processing unit 201 repeats step 301 and selects from the plurality of execution threads another set of execution threads having another order of threads, where each of the other set of threads is associated with one of two or more other ranges of application memory addresses. Optionally, processing unit 201 repeats 310 to organize another plurality of sequences of consecutive address sub-ranges in another interleaved sequence of address sub-ranges. Optionally, each of the plurality of sequences of consecutive address sub-ranges is associated with one other of the other set of execution threads. Optionally, each of the plurality of sequences of consecutive address sub-ranges consists of another consecutive sequence of application memory address sub-ranges of the respective range of application memory addresses associated with the respective one other execution thread associated therewith. Optionally, each other application memory address sub-range has another identified amount of memory bits, i.e. another step size. Optionally, the other step size is less than the amount of cache line bits. Optionally, the other step size is different from the step size.

Optionally, processing unit 201 alternately selects, for each other thread in the identified other order of threads, another next address sub0range in the respective other sequence of address sub-ranges associated with the other thread.

Optionally, processing unit 201 repeats 320 and generates another mapping of the other interleaves sequence of address sub-ranges to the range of physical memory addresses in the other order of the interleaved sequence of address sub-ranges.

Figure 5:
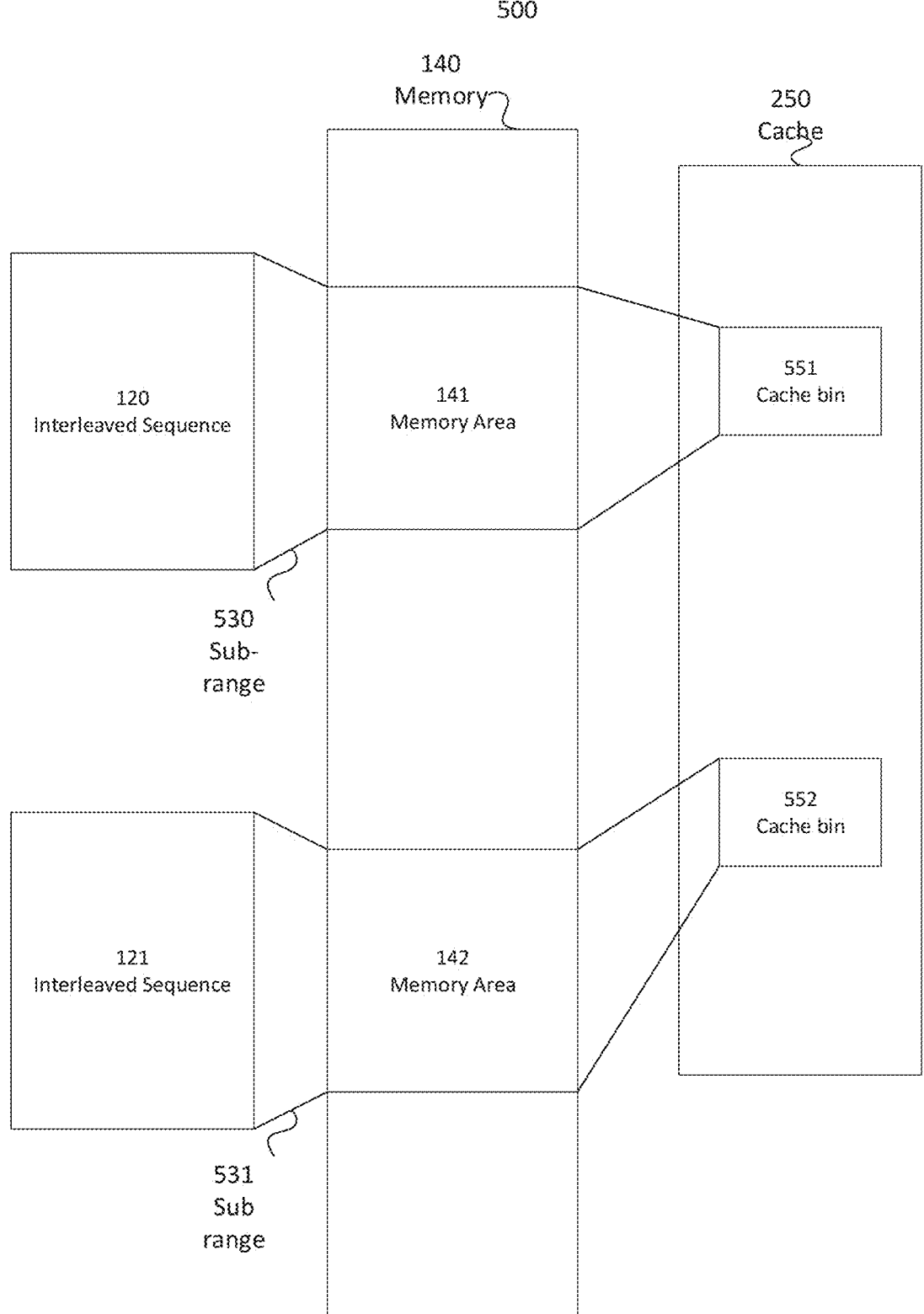
FIG. 5 is a block diagram schematically representing an exemplary caching, according to some embodiments.

Optionally, cache 250 comprises a plurality of cache bins. Reference is now made also to FIG. 5, showing a block diagram schematically representing an exemplary caching 500, according to some embodiments. In such embodiments, cache 250 comprises a plurality of cache bins, including cache bin 551 and cache bin 552. Optionally, cache 150 is one of the plurality of cache bins of cache 250, for example cache bin 551. Optionally, cache bin 551 comprises a first plurality of cache lines, each having a first amount of cache bits. Optionally, cache bin 552 comprises a second plurality of cache lines, each having a second amount of cache bits. Optionally, the first amount of cache bits is different from the second amount of cache bits. For example, the first amount of cache bits may be 512 bits and the second amount of cache bits may be 1024 bits.

Optionally, memory 140 is associated with one of the plurality of cache bins of cache 250.

Optionally, mapped physical range 130 comprises more than one sub-range of the range of physical memory addresses, for example mapped sub-range 530, addressing memory area 141, and other mapped sub-range 531, addressing memory area 142. Optionally, memory area 141 is associated with cache bin 551 and therefore mapped sub-range 530 is associated with cache bin 551. Optionally, memory area 142 is associated with cache bin 552 and therefore other mapped sub-range 531 is associated with cache bin 552.

Optionally, interleaved sequence of address sub-ranges 120 is mapped to mapped sub-range 530, such that a memory access to an address in a sub-range of interleaved sequence 120 is an access to memory area 141. Optionally, other interleaved sequence of address sub-ranges 121 is mapped to mapped sub-range 531, such that another memory access to another address in another sub-range of interleaved sequence 121 is another access to memory area 142.

When system 200 comprises a TLB, for example a TLB stored in cache 250, to increase TLB utilization processing unit 201 optionally encodes in a PTE in a hierarchy of page tables that are accessed when referencing a virtual memory address allocated to a thread of the plurality of threads a hint indicative of an amount of contiguous physical memory pages that may be referenced by a plurality of consecutive PTEs comprising the PTE. For example, processing unit 201 may encode the hint when organizing the plurality of sequences of consecutive address sub ranges in the interleaved sequence of address subranges.

Figure 6:
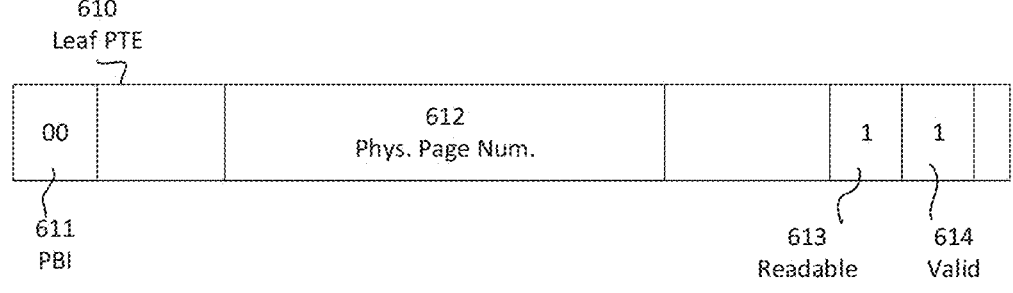
FIG. 6 is a block diagram schematically representing exemplary page table entries, according to some embodiments.
Figure 6:
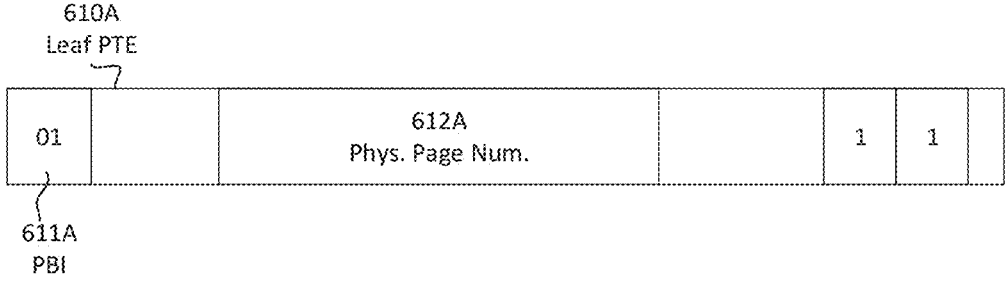
Figure 6:
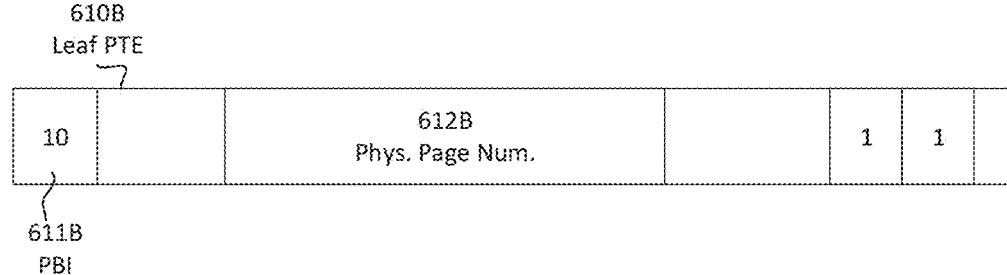
Figure 6:
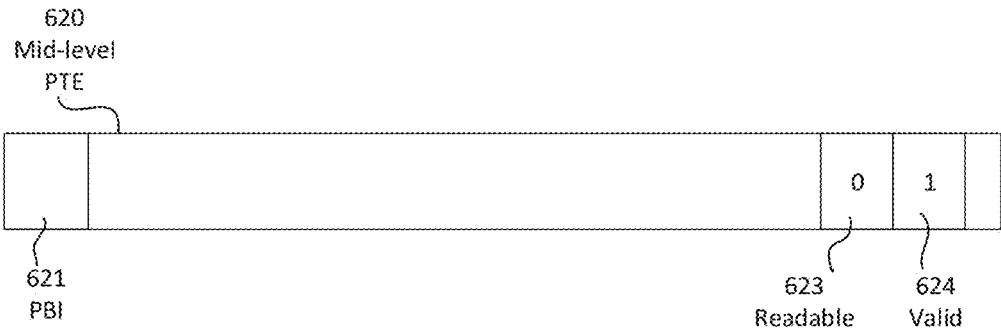

Optionally, processing unit 201 encodes the hint in part of a binary representation of the virtual address in the PTE. Reference is now made also to FIG. 6, showing a block diagram schematically representing exemplary page table entries 600, according to some embodiments. In such embodiments, leaf page entry 610 comprises Physical Page Number (PPN) 612. Optionally, PPN 612 is at least part of a page number of an effective physical memory page consisting of one or more contiguous physical memory pages.

When a page table is organized in a hierarchy of page tables, a leaf page table is a page table in a lowest level of the hierarchy of page tables. Optionally, an entry in a leaf page table comprises an indication as being an entry in a leaf page table, for example readable-indicator 613 in leaf PTE 610. Optionally, combination of readable-indicator 613 set to 1 and valid-indicator 614 set to 1 is indicative of a leaf PTE. On the other hand, readable-indicator 623 of mid-level PTE 620 may be set to 0 when valid-indicator 624 is set to 1, to indicate that mid-level PTE 620 is not a leaf PTE. In some other embodiments, other parts of the PTE may be used to indicate whether the PTE is a leaf PTE or a mid-level PTE. Optionally, a leaf PTE is indicated by a property of the page table the PTE is part of.

Optionally, each PTE of a page table used by memory management unit 210 comprises a hint indicative of an effective physical memory page size referenced thereof. Optionally, the hint is a page bump indicator indicative of an amount of contiguous physical memory pages the effective physical memory page consists of, for example PBI 611 of leaf PTE 610, where each of the contiguous physical memory pages has an identified page size. Optionally, PBI 611 is a binary representation of an exponent such the amount of contiguous physical memory pages that may be referenced by leaf PTE 610 is equal to 8 raised to the power of the value of PBI 611. Thus, effectively, leaf PTE 610 references a physical page having an effective size equal to the product of the identified page size and a multiplier equal to 8 raised to the power of the value of PBI 611. For example, when PBI 611 is equal 00 (binary value and decimal value 0), and therefore the multiplier is equal to 1, leaf PTE 610 references an effective physical page that consists of one physical page. When the identified page size is 64 kilobytes (KB), leaf PTE 610 references an effective physical page of 64 KB.

Optionally, PBI 611A of leaf PTE 610A has a binary value of 01 (decimal value of 1), indicating that leaf PTE 610A references another effective physical page consisting of 8 contiguous physical memory pages (as the multiplier is equal 8 to the power of 1). Optionally, PPN 612A of leaf PTE 610A is at least part of another physical page number of the other effective physical page. In this example, when the identified page size is 64 kilobytes (KB), leaf PTE 610A references an effective physical page of 512 KB (8×64 KB).

Similarly, PBI 611B of leaf PTE 610B may have a binary value of 10 (decimal value of 2), indicating that leaf PTE 610B references yet another effective physical page consisting of 64 contiguous physical memory pages (as the multiplier is equal 8 to the power of 2). Optionally, PPN 612B of leaf PTE 610B is at least part of yet another page number of the yet other effective physical page. In this example, when the identified page size is 64 kilobytes (KB), leaf PTE 610B references an effective physical page of 4 megabytes (MB) (64×64 KB).

When a minimum page size in a page table is smaller than a minimum native page size of an operating system executed by system 200, and when the minimum page size of the page table is a divider of the minimum native page size, each page of the operating system is optionally expressed as an integral amount of pages of virtual memory having the minimum page size of the page table, and represented by a plurality of PTEs, one for each of the integral amount of pages.

Optionally, when processing unit 201 supports an identified native minimum page size, using a PBI in a PTE allows processing unit 202 to use a minimum page size in a page table that is different from the identified native minimum page size used by processing unit 201.

In a page table, each entry typically references one minimum sized page. In some embodiments, when using a page bump indicator, a plurality of PTEs, each referencing one physical memory page of the one or more contiguous physical memory pages an effective physical page consists of, each have a common physical page number and a common page bump indicator. Optionally, the common physical page number is a page number of the effective physical page that consists of the one or more contiguous physical memory pages.

Optionally, PBI 611 is not an exponent of a multiplier and the multiplier is encoded in PBI 611 using another encoding, for example a mapping between a value of PBI 611 and a multiplier value.

When the page table is organized in a hierarchy of page tables, PBI 621 of mid-level PTE 620 optionally indicates a minimal page size of a next page table in the hierarchy such that the minimal page size of the next page table is a multiple of a page size referenced by mid-level PTE 620. Optionally, PBI 621 is encoded in a similar manner as PBI 611, and thus a value of binary 10 in PBI 621 indicates that the minimal page size of the next page table is 64 times the minimal page size of the table to which mid-level PTE 620 belongs. Encoding a minimum page size of a next level page table in a mid-level PTE allows reducing a size of one or more page tables in a hierarchy of page tables. Optionally, the size of the one or more page tables in the hierarchy of page tables is reduced by a factor equal to the value of the PBI in the PTE.

Optionally, an amount of bits in PBI 611 is a divider of an amount of bits used to represent a minimum page size in the leaf page table that leaf PTE 610 belongs to.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is expected that during the life of a patent maturing from this application many relevant caches will be developed and the scope of the terms "cache", "cache bin", "cache line" and "cache line amount of bits" are intended to include all such new technologies a priori.

As used herein the term "about" refers to ±10%.

The terms "comprises", "comprising", "includes", "including", "having" and their conjugates mean "including but not limited to". This term encompasses the terms "consisting of" and "consisting essentially of".

The phrase "consisting essentially of" means that the composition or method may include additional ingredients and/or steps, but only if the additional ingredients and/or steps do not materially alter the basic and novel characteristics of the claimed composition or method.

As used herein, the singular form "a", "an" and "the" include plural references unless the context clearly dictates otherwise. For example, the term "a compound" or "at least one compound" may include a plurality of compounds, including mixtures thereof.

The word "exemplary" is used herein to mean "serving as an example, instance or illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment may include a plurality of "optional" features unless such features conflict.

Throughout this application, various embodiments may be presented in a range format. It should be understood that the description in range format is merely for convenience and brevity and should not be construed as an inflexible limitation on the scope of embodiments. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of embodiments, which are, for clarity, described in the context of separate embodiments, may also be provided in combination in a single embodiment. Conversely, various features of embodiments, which are, for brevity, described in the context of a single embodiment, may also be provided separately or in any suitable subcombination or as suitable in any other described embodiment. Certain features described in the context of various embodiments are not to be considered essential features of those embodiments, unless the embodiment is inoperative without those elements.

Although embodiments have been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

It is the intent of the applicant(s) that all publications, patents and patent applications referred to in this specification are to be incorporated in their entirety by reference into the specification, as if each individual publication, patent or patent application was specifically and individually noted when referenced that it is to be incorporated herein by reference. In addition, citation or identification of any reference in this application shall not be construed as an admission that such reference is available as prior art to the present invention. To the extent that section headings are used, they should not be construed as necessarily limiting. In addition, any priority document(s) of this application is/are hereby incorporated herein by reference in its/their entirety.

What is claimed is:

1. A method for caching memory, comprising:
caching, in a cache memory for accessing a physical memory area connected to at least one hardware processor, the cache memory comprising a plurality of cache lines each having a cache line amount of bits, at least two data values, each of one of at least two ranges of application memory addresses, each associated with one of a set of execution threads having an identified order of threads and executed by the at least one hardware processor, by:
organizing a plurality of sequences of consecutive address sub-ranges, each sequence associated with one of the set of execution threads and consisting of a consecutive sequence of application memory address sub-ranges of the respective range of application memory addresses associated with the execution thread, each application memory address sub-range having an identified amount of memory bits less than the amount of cache line bits, in an interleaved sequence of address sub-ranges by alternately selecting, for each execution thread in the identified order of threads, a next address sub-range in the respective sequence of address sub-ranges associated therewith; and when an execution thread of the set of execution threads accesses an application memory address of the respective range of application memory addresses associated thereof:
storing the at least two data values in one cache line of the plurality of cache lines by accessing the physical memory area according to a mapping of the interleaved sequence of address sub-ranges to a range of physical memory addresses using the application memory address.

2. The method of claim 1, wherein for at least one of the set of execution threads the respective range of application memory addresses associated thereof is one of: the range of physical memory addresses, and a range of virtual memory address.

3. The method of claim 1, wherein accessing the physical memory area according to the mapping using the application memory address comprises retrieving a cache line amount of bits from the physical memory area.

4. The method of claim 1, further comprising computing a target memory address according to the mapping using the application memory address; wherein accessing the physical memory area according to the mapping using the application memory address is by using the target memory address.

5. The method of claim 4, wherein the target memory address is a target physical memory address.

6. The method of claim 4, wherein the target memory address is a linear virtual memory address; and
wherein the method further comprises:
computing another target physical memory address using the linear virtual memory address; and
accessing the physical memory area using the other target physical memory address instead of using the target memory address.

7. The method of claim 4, wherein each of the set of execution threads has an identification value according to the identified order of threads; and
wherein computing the target memory address comprises:
inserting into a binary representation of the target memory address an identified amount of lower bits of the application memory address; and
inserting into the binary representation of the target memory address a lane value indicative of the respective identification value of the execution thread.

8. The method of claim 7, wherein the physical memory area is organized in a plurality of physical memory pages, each having an amount of physical page bytes; and
wherein the identified amount of lower bits is a base 2 log of the amount of physical page bytes.

9. The method of claim 7, wherein the identified amount of lower bits of the application memory address are inserted into a low part of the binary representation of the target memory address; and
wherein the lane value is inserted into the binary representation of the target memory address immediately following the identified amount of lower bits of the application memory address.

10. The method of claim 9, wherein computing the target memory address further comprises rotating the identified amount of lower bits of the application memory address and the lane value.

11. The method of claim 10, wherein rotating the identified amount of lower bits and the lane value is rotating to the right by a base-2 log of the identified amount of memory bits.

12. The method of claim 1, wherein the execution thread accesses the application memory address of the respective range of application memory addresses to retrieve the identified amount of memory bits from the physical memory area.

13. The method of claim 1, wherein the set of execution threads are selected from a plurality of execution threads executed by the at least one hardware processor.

14. The method of claim 13, further comprising:

selecting from the plurality of execution threads another set of execution threads having another order of threads, each associated with one of at least two other ranges of application memory addresses;

organizing another plurality of sequences of consecutive address sub-ranges, each sequence associated with one other of the other set of execution threads and consisting of another consecutive sequence of application memory address sub-ranges of the respective range of application memory addresses associated with the other execution thread, each other application memory address sub-range having another identified amount of memory bits less than the amount of cache line bits, in another interleaved sequence of address sub-ranges by alternately selecting, for each other execution thread in the identified other order of threads, another next address sub-range in the respective other sequence of address sub-ranges associated therewith; and generating another mapping of the other interleaved sequence of address sub-ranges to the range of physical memory addresses in the other order of the interleaved sequence of address sub-ranges.

15. The method of claim 14, wherein the cache memory comprises a plurality of cache bins;

wherein the range of physical memory addresses comprises:

a first subrange of the range of physical memory addresses, associated with a first cache bin of the plurality of cache bins, and a second subrange of the range of physical memory addresses, associated with a second cache bin of the plurality of cache bins; and wherein the mapping of the interleaved sequence of address sub-ranges is to the first subrange of the range of physical memory addresses, and the other mapping of the other interleaved sequence of address sub-ranges is to the second subrange of the range of physical memory addresses.

16. The method of claim 15, wherein the first cache bin comprises a first plurality of cache lines each having a first amount of cache bits; and wherein the second cache bin comprises a second plurality of cache lines each having a second amount of cache bits.

17. The method of claim 13, wherein the set of execution threads is selected from the plurality of execution threads according to a plurality of statistical values collected while executing the plurality of execution threads.

18. The method of claim 17, wherein the plurality of statistical values comprises at least one of: an amount of accesses to an application memory address, an order of accesses to a plurality of application memory addresses, an association between an application memory address and a thread identification value, and an amount of application memory in an application memory area.

19. The method of claim 1, wherein the cache memory comprises a plurality of cache bins; and wherein the range of physical memory addresses is associated with one of the plurality of cache bins.

20. A system for caching memory, comprising at least one hardware processor adapted for:

caching, in a cache memory for accessing a physical memory area connected to at least one other hardware processor, the cache memory comprising a plurality of cache lines each having a cache line amount of bits, at least two data values, each of one of at least two ranges of application memory addresses, each associated with one of a set of execution threads having an identified order of threads and executed by the at least one other hardware processor, by:

organizing a plurality of sequences of consecutive address sub-ranges, each sequence associated with one of the set of execution threads and consisting of a consecutive sequence of application memory address sub-ranges of the respective range of application memory addresses associated with the execution thread, each application memory address sub-range having an identified amount of memory bits less than the amount of cache line bits, in an interleaved sequence of address sub-ranges by alternately selecting, for each execution thread in the identified order of threads, a next address sub-range in the respective sequence of address sub-ranges associated therewith; and when an execution thread of the set of execution threads accesses an application memory address of the respective range of application memory addresses associated thereof:

storing the at least two data values in one cache line of the plurality of cache lines by accessing the physical memory area according to a mapping of the interleaved sequence of address sub-ranges to a range of physical memory addresses using the application memory address.

21. The system of claim 20, wherein the at least one other hardware processor is a configurable computation grid.

* * * * *